United States Patent
Cho et al.

(10) Patent No.: US 8,847,953 B1
(45) Date of Patent: Sep. 30, 2014

(54) APPARATUS AND METHOD FOR HEAD MOUNTED DISPLAY INDICATING PROCESS OF 3D PRINTING

(71) Applicant: LG Electronics Inc., Seoul (KR)

(72) Inventors: Eunhyung Cho, Seoul (KR); Jongho Kim, Seoul (KR); Doyoung Lee, Seoul (KR); Jihwan Kim, Seoul (KR); Sinae Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/158,334

(22) Filed: Jan. 17, 2014

(30) Foreign Application Priority Data

Oct. 31, 2013 (KR) .......................... 10-2013-0131080

(51) Int. Cl.
```
G06T 17/00    (2006.01)
G06T 15/00    (2011.01)
B29C 67/00    (2006.01)
G06T 19/00    (2011.01)
G02B 27/01    (2006.01)
```
(52) U.S. Cl.
CPC ........... *G06T 19/006* (2013.01); *B29C 67/0085* (2013.01); *B29C 67/0051* (2013.01); *G02B 27/0172* (2013.01)
USPC ......................................... 345/420; 345/419

(58) Field of Classification Search
CPC .............. G06T 19/006; B29C 67/0051; B29C 67/0085
USPC ................................................. 345/419, 420
See application file for complete search history.

(56) References Cited

U.S. PATENT DOCUMENTS

| | | | |
|---|---|---|---|
| 7,290,221 B2 | 10/2007 | Anderson et al. | |
| 7,697,750 B2* | 4/2010 | Simmons | 382/154 |
| 8,562,324 B2* | 10/2013 | Pettis | 425/150 |
| 2006/0244907 A1* | 11/2006 | Simmons | 351/162 |
| 2007/0211081 A1* | 9/2007 | Quadling et al. | 345/632 |

(Continued)

FOREIGN PATENT DOCUMENTS

JP      2004-206175 A      7/2004

OTHER PUBLICATIONS

Dezeen; "Inition develops 'augmented 3D printing' for architects"; Jan. 4, 2013; http://www.dezeen.com/2013/01/04/inition-develops-augmented-3d-printing-for-architects/.*

(Continued)

*Primary Examiner* — David T Welch
(74) *Attorney, Agent, or Firm* — Birch, Stewart, Kolasch & Birch, LLP (57) ABSTRACT

A method for controlling a head mount display (HMD) according to one embodiment comprises the steps of detecting a 3D printer as a first marker through a camera unit; displaying a first augmented reality image of a shape of a 3D object on the basis of the detected first marker before the 3D object is output by the 3D printer; detecting the 3D object, which is output from the 3D printer, as a second marker if the 3D printer starts to output the 3D object; updating the first augmented reality image to a second augmented reality image on the basis of the first marker and the second marker; and displaying the second augmented reality image.

23 Claims, 8 Drawing Sheets

(56) References Cited

U.S. PATENT DOCUMENTS

| | | | |
|---|---|---|---|
| 2012/0105903 A1 | 5/2012 | Pettis | |
| 2012/0122062 A1* | 5/2012 | Yang et al. | 434/219 |
| 2012/0123742 A1* | 5/2012 | Harrison et al. | 703/1 |
| 2012/0224755 A1 | 9/2012 | Wu | |
| 2012/0235827 A1 | 9/2012 | Chi et al. | |
| 2012/0327117 A1* | 12/2012 | Weller et al. | 345/633 |
| 2013/0096708 A1 | 4/2013 | Danks | |
| 2014/0035182 A1* | 2/2014 | Boyer et al. | 264/40.1 |
| 2014/0039662 A1* | 2/2014 | Boyer et al. | 700/118 |
| 2014/0039663 A1* | 2/2014 | Boyer et al. | 700/118 |

OTHER PUBLICATIONS

MakerBot; Thingiverse UltimARker page; May 10, 2013; http://www.thingiverse.com/thing:87078.*

Ricardo Bilton; VB/Offbeat; "What happens when you combine 3D printing and augmented reality? Magic"; May 14, 2013; http://venturebeat.com/2013/05/14/3d-printing-plus-augmented-reality-equals-awesome/; associated video published May 10, 2013: http://www.youtube.com/watch?v=8lk9GhU36b4.*

SNDRV; UltimARker description; Jun. 15, 2013; http://www.sndrv.nl/ultimarker/.*

Inition; "Augmented 3D priting for Zaha Hadid"; Jun. 26, 2013; http://inition.co.uk/case-study/augmented-3d-printing-zaha-hadid.*

* cited by examiner

APPARATUS AND METHOD FOR HEAD MOUNTED DISPLAY INDICATING PROCESS OF 3D PRINTING

This application claims the benefit of the Korean Patent Application No. 10-2013-0131080, filed on Oct. 31, 2013, which is hereby incorporated by reference as if fully set forth herein.

BACKGROUND OF THE DISCLOSURE

1. Field of the Disclosure

The present specification relates to a head mounted display, and more particularly, to a head mounted display that indicates a process of 3D printing.

2. Discussion of the Related Art

Augmented reality technology in which real objects are mixed with virtual objects provides additional information together with reality by allowing a user to view a reality image together with an augmented image. A head mounted display (HMD) may detect a real object as a marker through a camera unit, and may display an augmented image on the basis of the detected marker. The HMD may display the augmented image through a display unit.

The HMD may include additional information on a real object in the augmented image displayed to correspond to the marker. Accordingly, the user may acquire the additional information on the real object from the displayed augmented reality image.

SUMMARY OF THE DISCLOSURE

Accordingly, the present specification is directed to an apparatus and method for a head mounted display (HMD) indicating a process of 3D printing, which substantially obviate one or more problems due to limitations and disadvantages of the related art.

An object of the present specification is to provide an HMD and a method for controlling the same, in which an augmented reality image on a 3D object, which is the output result of 3D printing, is displayed. Particularly, in this specification, the HMD is needed to provide a method for adaptively changing an augmented reality image displayed in accordance with an output process of a 3D object.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a head mounted display (HMD) according to one embodiment of the present specification comprises a camera unit configured to detect a first marker and a second marker; a display unit configured to display an augmented reality image corresponding to the first marker or the second marker; and a controller configured to control the camera unit and the display unit, wherein the controller detects at least a part of a 3D printer as the first marker through the camera unit, displays a first augmented reality image of a shape of the 3D object on the basis of the detected first marker before the 3D object is output by the 3D printer, detects the 3D object, which is output from the 3D printer, as the second marker if the 3D printer starts to output the 3D object, updates the first augmented reality image to a second augmented reality image on the basis of the first marker and the second marker, and displays the second augmented reality image.

In another aspect of the present specification, a method for controlling a head mounted display (HMD) comprises the steps of detecting a 3D printer as a first marker through a camera unit; displaying a first augmented reality image of a shape of a 3D object on the basis of the detected first marker before the 3D object is output by the 3D printer; detecting the 3D object, which is output from the 3D printer, as a second marker if the 3D printer starts to output the 3D object; updating the first augmented reality image to a second augmented reality image on the basis of the first marker and the second marker; and displaying the second augmented reality image.

According to the present specification, the HMD may display the shape of the 3D object, which will be output from the 3D printer, as the augmented reality image.

Also, according to the present specification, the HMD may detect the 3D printer as the first marker and detect the 3D object as the second marker.

Also, according to the present specification, the HMD may display the shape of the 3D object, which is being output from the 3D printer, as the augmented reality image.

Also, according to the present specification, the HMD may display the augmented reality image seamlessly to the shape of the 3D object, which is being output from the 3D printer.

Also, according to the present specification, the HMD may change the augmented reality image displayed in accordance with an output process of the 3D printer.

Also, according to the present specification, the HMD may display the output process of the 3D printer as the augmented reality image.

Also, according to the present specification, the HMD may display a part of the 3D object, which is not output, as the augmented reality image.

Also, according to the present specification, the HMD may update marker information in accordance with the output process of the 3D object.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE DISCLOSURE

Reference will now be made in detail to the preferred embodiments of the present specification, examples of which are illustrated in the accompanying drawings. Wherever possible, the same reference numbers will be used throughout the drawings to refer to the same or like parts. Moreover, although the embodiments will be described in detail with reference to the accompanying drawings and the disclosure described by the drawings, it is to be understood that the claims are not limited by such embodiments.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

In this specification, a head mounted display may include a wearable device that is worn on a body of a user to display visual information. Also, in this specification, a method for controlling a head mounted display may be applied to a portable device that includes a display unit. For example, the portable device may include a smart phone, a smart pad, a notebook computer, a tablet computer, a music player, a smart table, a monitor or television.

In this specification, a 3D printer may output 3D objects in various manners. For example, the 3D printer of this specification may output 3D objects by using a selective laser sintering (SLS) scheme, a fused deposition modeling (FDM) scheme, a direct metal laser sintering (DMLS) scheme, a stereo lithography (SLA) scheme, a laminated object manufacturing (LOM) scheme, an electron beam melting (EBM) scheme, and a powder bed & plaster-based (PP) scheme. In this case, the FDM scheme and the LOM scheme may configure 3D objects through at least one 3D printing layer output from the 3D printer.

Figure 1:
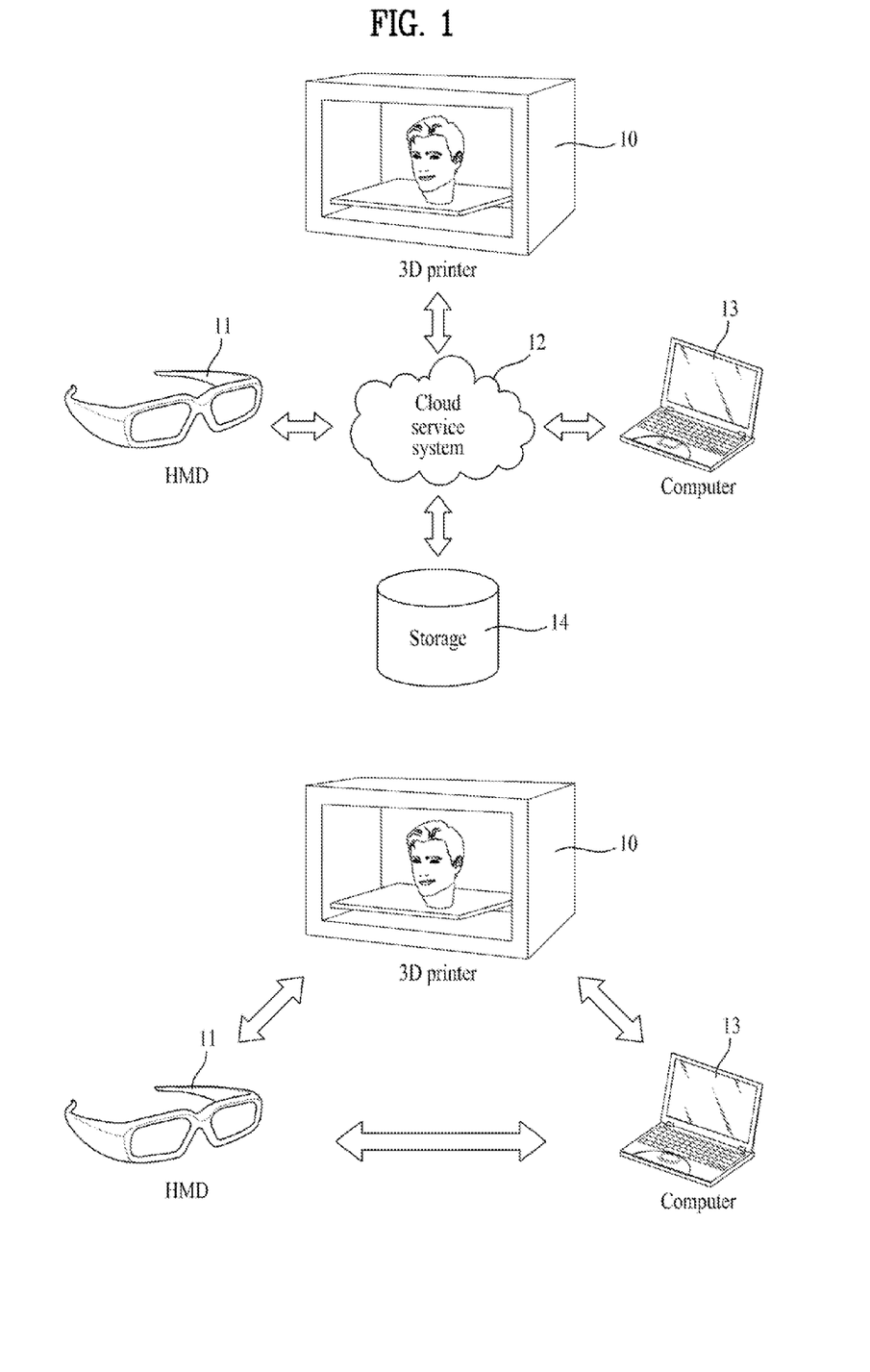
FIG. 1 is a diagram illustrating a connection state between an HMD and an external device according to one embodiment of the present specification.

FIG. 1 is a diagram illustrating a connection state between an HMD and an external device according to one embodiment of the present specification. The external device connected with the HMD may include a 3D printer, a cloud service system, a smart phone, a tablet computer, a notebook computer, or a desktop computer. At a top of FIG. 1, a 3D printer 10 and an HMD 11 may be connected with each other a cloud service system 12. Also, the 3D printer 10, the HMD 11, a computer 13 and a storage 14 may be connected with one another through a network or the cloud service system 12. The HMD 11 may acquire information on an augmented reality image from the 3D printer 10, the computer 13 and the storage 14 through the network or the cloud service system 12. The information on the augmented reality image may include information on a 3D object output from the 3D printer 10 and information on a control interface that controls the 3D printer 10.

For example, the HMD 11 may receive the information on 3D object from the 3D printer 10 that outputs 3D object. The information on the 3D object may include at least one of shape, material, color, mass, and volume of the 3D object. Also, the information on the 3D object may include an output progress status of the 3D object which is being output. For example, the output progress status of the 3D object may represent how many percent of the 3D object has been output and how much time remains until the output is completed.

Also, the HMD 11 may receive the information on the control interface, which controls the 3D printer 10, from the 3D printer that outputs the 3D object. The information on the control interface may include a control interface that changes color, size, material, etc. of the 3D object which will be output from the 3D printer. Also, the information on the control interface may include a control interface that controls the output of the 3D printer. For example, the information on the control interface may include an interface, which temporarily stops or resumes the output of the 3D printer, or an interface which cancels the output of the 3D printer.

According to another embodiment, the HMD 11 may receive the information on the 3D object or the information on the control interface from the computer 13 that controls the 3D printer 10. The HMD 11 may access the computer 13, which controls the 3D printer, through the network or the cloud service system 12, and may receive the information on the 3D object or the information on the control interface. The information on the 3D object may include at least one of shape, material, color, mass and volume of the 3D object. Also, the information on the 3D object may include the output progress status of the 3D object which is being output. The information on the control interface may include a control interface that changes color, size, material, etc. of the 3D object which will be output from the 3D printer. Also, the information on the control interface may include a control interface that controls the output of the 3D printer. The HMD 11 may display the shape of the 3D object by using the received information on the 3D object. Also, the HMD 11 may control the 3D printer through the computer 13 by using the received information on the control interface.

According to another embodiment, the HMD 11 may receive the information on the 3D object from the storage 14, which exists in the network or the cloud service system 12. The information on the 3D object may include at least one of shape, material, color, mass and volume of the 3D object. Also, the information on the 3D object may include the output progress status of the 3D object which is being output. For example, the HMD 11 may receive the information on a shape of a 3D object, which is desired to be output, from the storage 14, and display the shape of the 3D object as the augmented reality image by overlapping the shape of the 3D object with the output 3D object. In this case, the augmented reality image may be 3D augmented reality image.

Unlike the top of FIG. 1 illustrating that the HMD 11 is connected with the external devices through the network or the cloud service system, the 3D printer 10, the HMD 11 and the computer 13 may directly be connected with one another as illustrated at the bottom of FIG. 1. For example, the 3D printer 10, the HMD 11 and the computer 13 may be connected with one another through Bluetooth, near field communication (NFC), zigbee, and wireless LAN. The HMD 11 may acquire the information on the augmented reality image from the 3D printer 10 and the computer 13 which are connected with each other as above. As one embodiment, the HMD 11 may perform pairing with the 3D printer through a communication unit, and may receive the information on the augmented reality image from the 3D printer.

As described with the top of FIG. 1, the information on the augmented reality image may include information on the 3D object output from the 3D printer 10 and the information on the control interface that controls the 3D printer 10. The information on the 3D object may include at least one of shape, material, color, mass and volume of the 3D object. Also, the information on the 3D object may include the output progress status of the 3D object which is being output. The information on the control interface may include a control interface that changes color, size, material, etc. of the 3D object which will be output from the 3D printer. Also, the information on the control interface may include a control interface that controls the output of the 3D printer.

Figure 2:
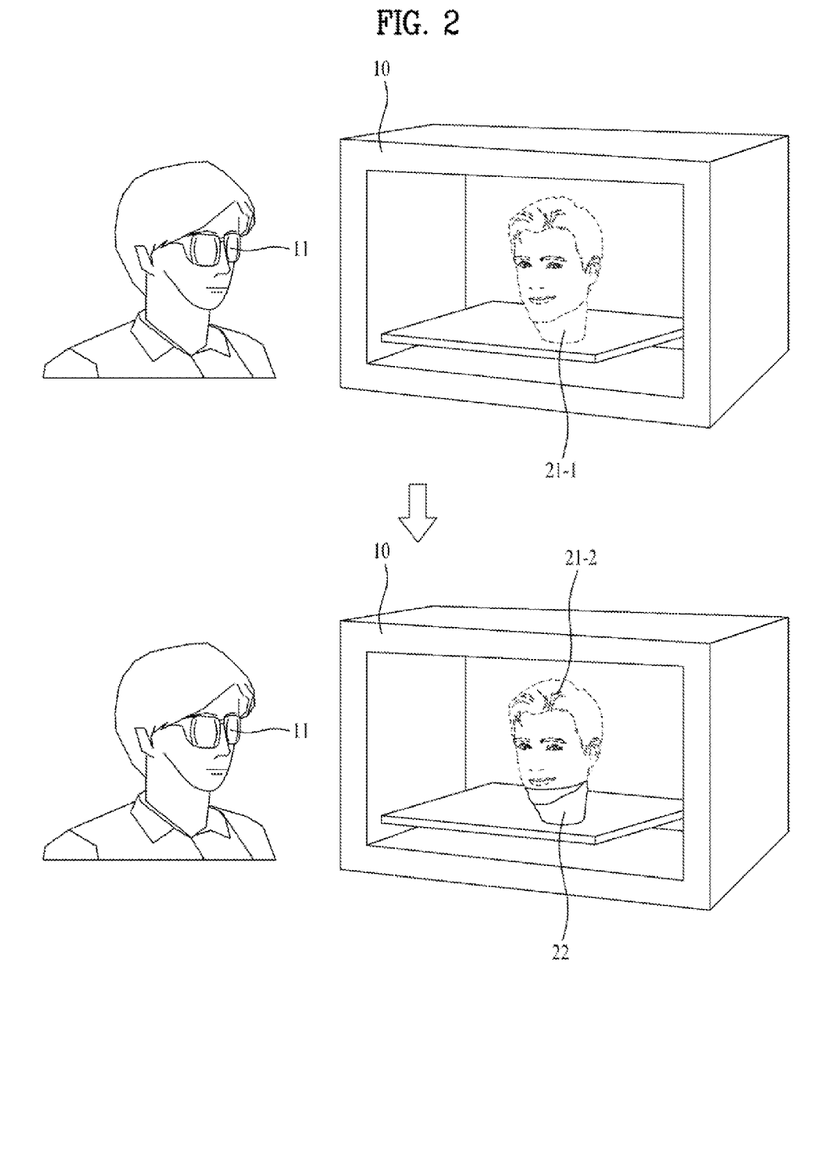
FIG. 2 is a diagram illustrating a method for allowing an HMD according to one embodiment of the present specification to display a shape of a 3D object as an augmented reality image.

FIG. 2 is a diagram illustrating a method for allowing an HMD according to one embodiment of the present specification to display a shape of a 3D object as an augmented reality image. At the top of FIG. 2, a user may wear the HMD 11. The HMD 11 may detect the 3D printer 10 as a first marker through a camera unit, and may display an augmented reality image corresponding to the first marker. In this case, the augmented reality image may be 3D augmented reality image.

The HMD 11 may be connected with the 3D printer 10 through the network or the cloud service system. Also, the HMD 11 may directly be connected with the 3D object 10 through wire or wireless service in accordance with the embodiment. The HMD 11 may receive the information on the 3D object, which will be output, and the information on the control interface of the 3D printer 10 from the 3D printer 10.

As shown at the top of FIG. 2, before the 3D object is output by the 3D printer 10, the HMD 11 may detect at least a part of the 3D printer 10 as a first marker. For example, the HMD 11 may detect an output tray which is the location where the result of 3D printing of the 3D printer 10 is output, as the first marker. In other words, the HMD 11 may detect a part of the 3D printer, where the 3D object which is the result of 3D printing will be located, as the first marker. As another embodiment, the HMD 11 may detect an entire shape of the 3D printer as the first marker.

The HMD 11 may display a first augmented reality image 21 on the basis of the detected location of the first marker. The HMD 11 may display the shape of the 3D object as a first augmented reality image 21-1 on the basis of the 3D object received from the 3D printer 10. The HMD may display a shape of a part of the 3D object, which is not output, as the first augmented reality image 21-1. In other words, before the 3D object is output by the 3D printer 10, the HMD 11 may display the entire shape or final shape of the 3D object as the first augmented reality image 21-1.

As a result, the user may visually identify the first augmented reality image 21-1 which is displayed, and may be informed the shape of the 3D object even before the output of the 3D object starts.

As shown at the bottom of FIG. 2, if the output of the 3D object is started by the 3D printer 10, the HMD 11 may detect a first part 22 of the 3D object, which is partially printed together with the first marker, as a second marker. For example, the HMD 11 may detect the first part 22 only which is printed, as the second marker if the first part 22 of the entire shape of the 3D object is printed and the other parts are not printed. The HMD 11 may exactly determine the location, where the augmented reality image is displayed, by additionally detecting the second marker.

As shown at the bottom of FIG. 2, the HMD 11 may update the first augmented reality image 21-1 to a second augmented reality image 21-2 on the basis of the locations of the first marker and the second marker which are detected. In other words, the HMD 11 may update the first augmented reality image, which includes the entire shape of the 3D object, to the second augmented reality image, which includes a partial shape of the 3D object. The HMD 11 may display the shape of the part of the 3D object, which is not output, as the second augmented reality image 21-2.

The HMD 11 may display the first part 22 of the 3D object, which has been already output, among the entire shape of the 3D object, that is, the other part except for the part corresponding to the second marker, as the second augmented reality image 21-2. As a result, the user may visually identify the second augmented reality image 21-2. If the output of the 3D object starts, the HMD 11 may inform the user of the process of 3D printing by updating the first augmented reality image to the second augmented reality image in accordance with the progress status of the 3D object, which is output. As 3D printing is performed, the user may identify, through the updated augmented reality image, how much 3D printing has been performed and how much process to be performed remains.

Figure 3:
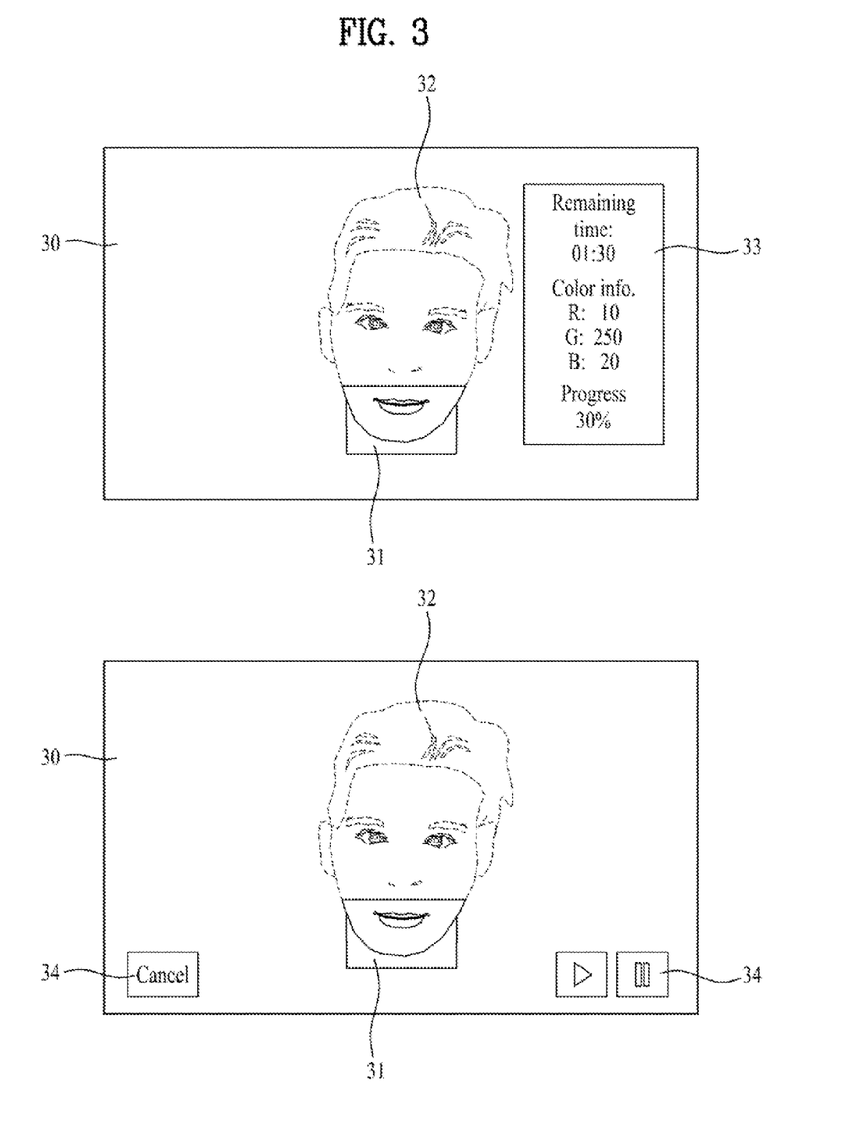
FIG. 3 is a diagram illustrating additional information displayed in an HMD according to one embodiment of the present specification.

FIG. 3 is a diagram illustrating additional information displayed in an HMD according to one embodiment of the present specification. The HMD may detect 3D object 31 output from the 3D printer by using the camera unit. The HMD may detect the detected 3D object 31 as the second marker and display digital information on the basis of the location of the second marker. Hereinafter, a zone where the digital information is displayed by the HMD will be referred to as a display screen 30. The user may visually identify the digital information displayed on the display screen 30.

As shown at the top of FIG. 3, the HMD may provide the display screen 30 to the user by using a display unit. The HMD may display an augmented reality image 32 and information 33 on a 3D object on the display screen 30. The HMD may seamlessly display the augmented reality image 32 on the detected 3D object 31. In other words, the HMD may seamlessly display the augmented reality image 32 on the detected second marker. The HMD may display the augmented reality image 32, which is a virtual object, seamlessly subsequent to the 3D object 31, which is a real object. The HMD may display the information 33 on the 3D object together with the augmented reality image 32. The HMD may display the remaining time until 3D printing is completed, color information on the 3D object, and an indicator indicating how many percent of 3D printing has been performed, as the information 33 on the 3D object. Also, the HMD may further display output process information on the 3D object as additional information.

Also, the HMD may display at least one of size information, material information, volume information and mass information of the 3D object as the information 33 on the 3D object. The user may visually identify the information 33 on the displayed 3D object and may be informed information as to how much 3D printing has been performed and information as to when 3D printing ends.

As shown at the bottom of FIG. 3, the HMD may display the augmented reality image 32 and a control interface 34 that controls the 3D printer on the display screen 30 by using the display unit. The HMD may display the augmented reality image on the detected 3D object 31 seamlessly. The HMD may display the augmented reality image 32, which is a virtual object, seamlessly subsequent to the 3D object 31, which is a real object. The HMD may display an interface that temporarily stops 3D printing which is being processed, or starts 3D printing, and may display an interface that cancels 3D printing. The user may visually identify the progress status of 3D printing, and may temporarily stop or resume 3D printing by using the displayed control interface 34. The user may cancel 3D printing as the case may be.

Figure 4:
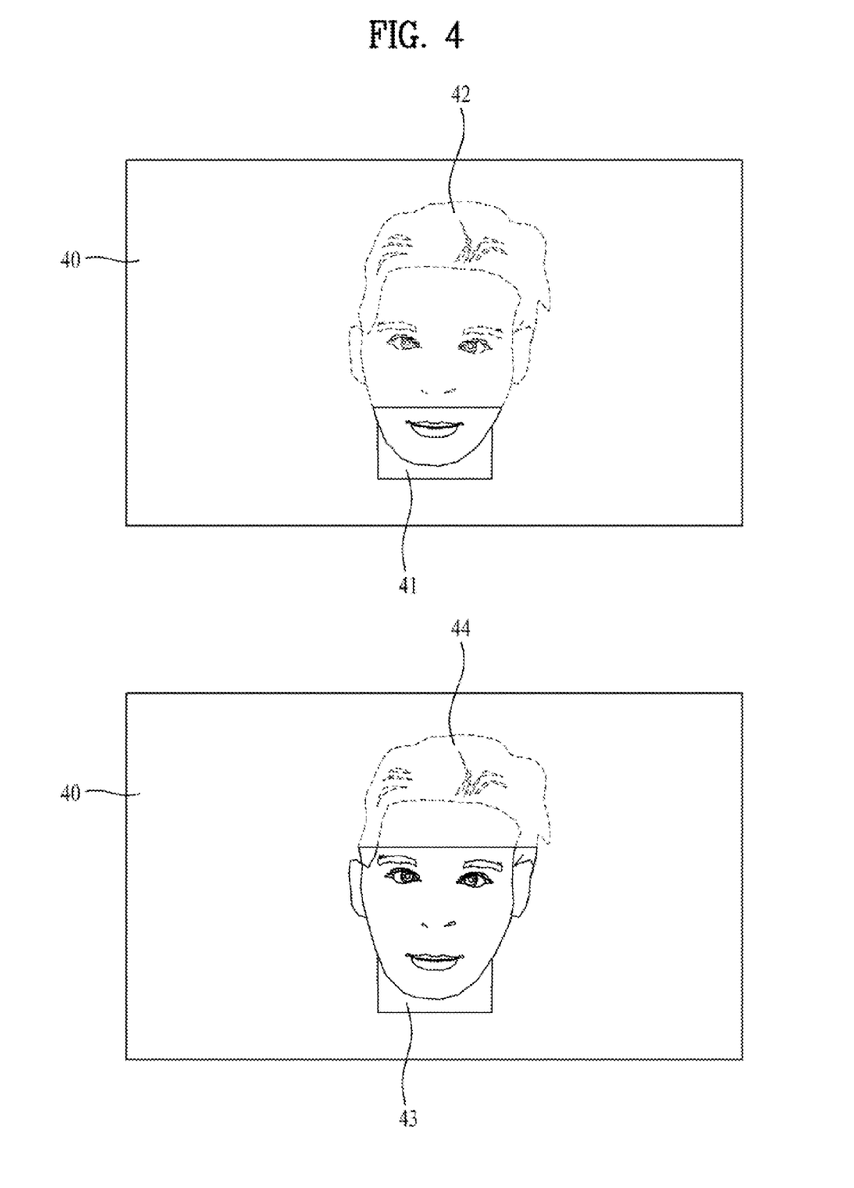
FIG. 4 is a diagram illustrating a method for allowing an HMD according to one embodiment of the present specification to detect a 3D object output from a 3D printer as a marker.

FIG. 4 is a diagram illustrating a method for allowing an HMD according to one embodiment of the present specification to detect a 3D object output from a 3D printer as a marker. The shape of the 3D object is changed as 3D printing is performed. For example, a deposition type 3D printer that uses fused deposition modeling may start 3D printing from the bottom of the 3D object and end 3D printing at the top of the 3D object. As described with reference to FIG. 2, the HMD may detect the 3D object, which is being output, as the second marker while 3D printing is being performed. Accordingly, the HMD may detect the 3D object of which shape is changed while 3D printing is being performed, as the second marker. The HMD may adaptively update the augmented reality image displayed in accordance with the output status of the 3D object detected as the second marker. In this case, the augmented reality image may be 3D augmented reality image.

The HMD may receive the information on the 3D object from the 3D printer or the external device connected with the 3D printer. The information on the 3D object may include shape information of the 3D object. The HMD may detect the second marker by using the shape information of the 3D object. The HMD may detect the output 3D object as the second marker if the 3D printer starts to output the 3D object. The HMD may match the 3D object output from the 3D printer with the shape information of the 3D object by using the shape information of the 3D object. In other words, the HMD may determine whether the 3D object of which a part is output is matched with a part of the shape information of the 3D object.

If the 3D object of which first part 41 is output is matched with the shape information of the 3D object, the HMD may display the shape of the 3D object on the display screen 40 as the second augmented reality image 42. In other words, the HMD may detect the first part of the 3D object as the second marker and display the second augmented reality image 42 corresponding to the second marker. In this case, the display screen 40 may mean a zone or space where the HMD displays the augmented reality image through the display unit. The HMD may display a part of the entire shape of the 3D object, which is not printed, as the second augmented reality image. In other words, the HMD may display the other shape except for the first part 41, which has been already output, from the entire shape of the 3D object, as the second augmented reality image 42.

The HMD may display the second augmented reality image 42 to correspond to the first part 41 of the output 3D object, that is, the location of the second marker. The HMD may display the second augmented reality image 42 by seamlessly connecting the second augmented reality image 42 to the first part 41 of the output 3D object. Accordingly, the user may identify the first part 41 of the 3D object, which has been already output, as the real object, and may identify the other part of the 3D object, which is not output, as the virtual object through the second augmented reality image 42.

After the first part 41 of the 3D object is output, as 3D printing is performed, if a second part 43 of the 3D object is output, the HMD may update the second marker. If the output scheme of the 3D printer is FDM scheme, the HMD may update the second marker when the 3D printing layer is additionally provided. In accordance with embodiment, the second part 43 of the 3D object may mean the first part or the part output additionally after the first part is output. Hereinafter, the second part 43 will include the first part and the part output additionally after the first part is output.

The HMD may detect the second part 43 of the 3D object as the updated second marker. If the updated second marker is detected, the HMD may update the second augmented reality image 42 displayed on the display screen 40. The HMD may display a third augmented reality image 44 to correspond to the updated second marker. The third augmented reality image 44 may be the image obtained by update of the second augmented reality image 42.

The HMD may display the part of the entire shape of the 3D object, which is not printed, as the third augmented reality image 44. In other words, the HMD may display the other shape except for the second part 43, which has been already output, from the entire shape of the 3D object, as the third augmented reality image 44.

The HMD may display the third augmented reality image 44 to correspond to the second part 43 of the output 3D object, that is, the location of the updated second marker. The HMD may display the third augmented reality image 44 by seamlessly connecting the third augmented reality image 44 to the second part 43 of the output 3D object. Accordingly, the user may identify the second part 43 of the 3D object, which has been already output, as the real object, and may identify the other part of the 3D object, which is not output, as the virtual object through the third augmented reality image 44.

Figure 5:
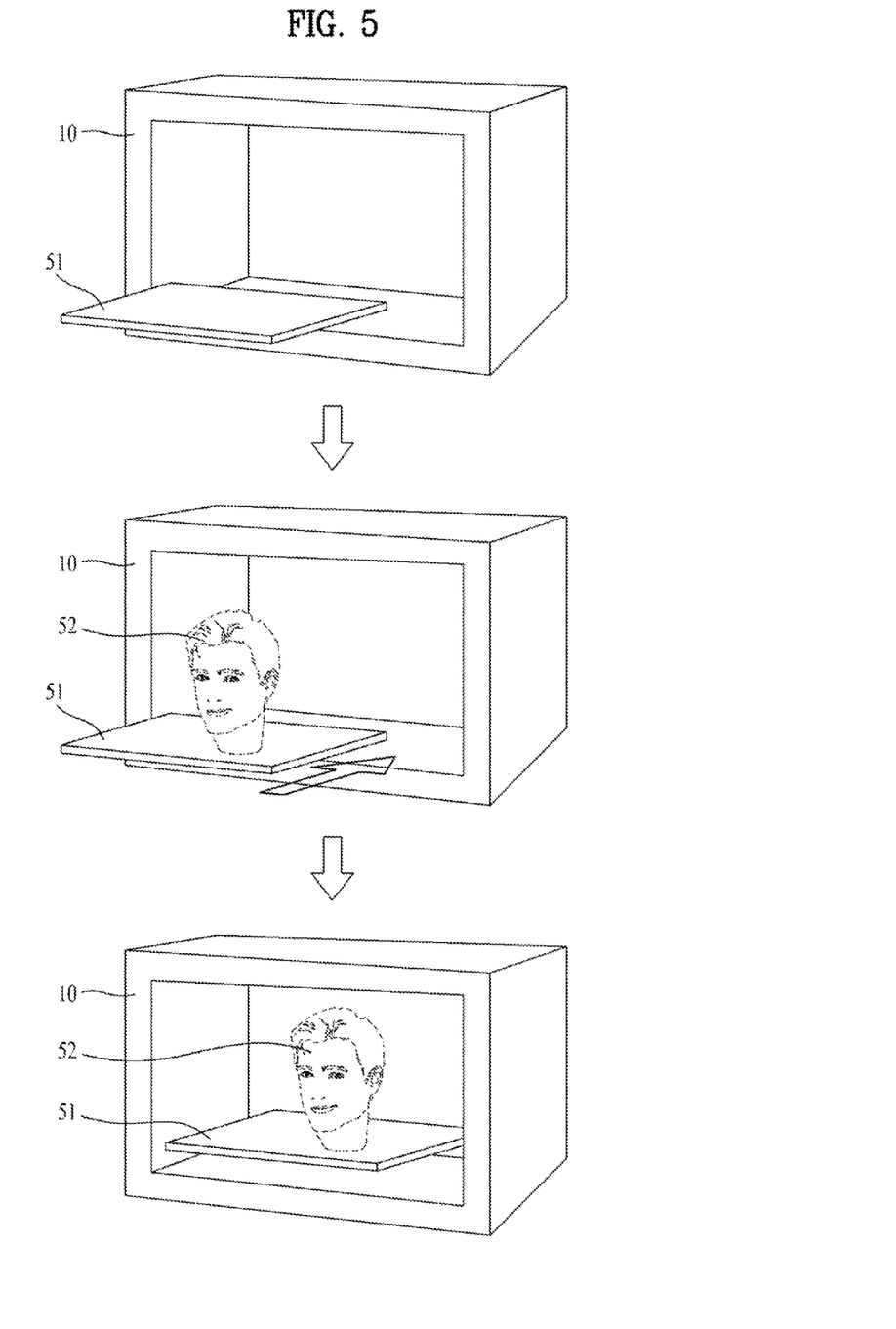
FIG. 5 is a diagram illustrating a method for allowing an HMD according to one embodiment of the present specification to change a location of an augmented reality image in accordance with an operation of a 3D printer.

FIG. 5 is a diagram illustrating a method for allowing an HMD according to one embodiment of the present specification to change a location of an augmented reality image in accordance with an operation of a 3D printer. The HMD may change the location of the displayed augmented reality image in accordance with the operation of the 3D printer connected with the HMD. The HMD may inform the user that the HMD is operated by being connected with the 3D printer, by changing the location of the augmented reality image.

At the top of FIG. 5, the 3D printer 10 may include an output tray 51 which is the part where the 3D object is output. The 3D printer 10 may move the output tray 51 to its outside at a standby state before 3D printing starts. The HMD may display a shape of a 3D object desired to be output, as the augmented reality image 52. As shown at the middle of FIG. 5, the user may locate the shape of the 3D object, which is displayed as the augmented reality image, at the output tray 51 of the 3D printer. As shown at the middle of FIG. 5, the location of the augmented reality image 52 displayed at the output tray 51 moved to the outside of the 3D printer may be defined as the first location.

If the HMD is connected with the 3D printer 10, and if the shape of the 3D object is located at the output tray 51 of the 3D printer, the HMD may transmit a 3D printing order to the 3D printer 10. The 3D printing order is a command language that allows the 3D object indicated by the HMD to be output from the 3D printer. The 3D printing order may include information on the 3D object. For example, the information on the 3D object may include at least one of shape information, color information, size information, volume information and mass information of the 3D object. The HMD may transmit the 3D printing order on the 3D object corresponding to the augmented reality image 52 displayed on the output tray 51 of the 3D printer 10 to the 3D printer 10.

The 3D printer may receive the 3D printing order from the HMD and start 3D printing on the basis of the information on the 3D object included in the received 3D printing order. As shown at the bottom of FIG. 5, the 3D printer may move the output tray 51 where the shape of the 3D object, which is an output target, is located, to its inside and start 3D printing. As shown at the bottom of FIG. 5, the location of the augmented reality image 52 displayed at the output tray 51 moved to the inside of the 3D printer may be defined as the second location.

If the output tray 51 of the 3D printer moves from the outside of the 3D printer to the inside of the 3D printer, the HMD may move the location of the displayed augmented reality image 52. The HMD may change the location of the augmented reality image 52 from the first location to the second location, so that the augmented reality image 52 may be displayed on the output tray 51 moved to the inside of the 3D printer. As a result, the HMD may display the augmented reality image 52 to correspond to the location where the 3D object will be output.

Figure 6:
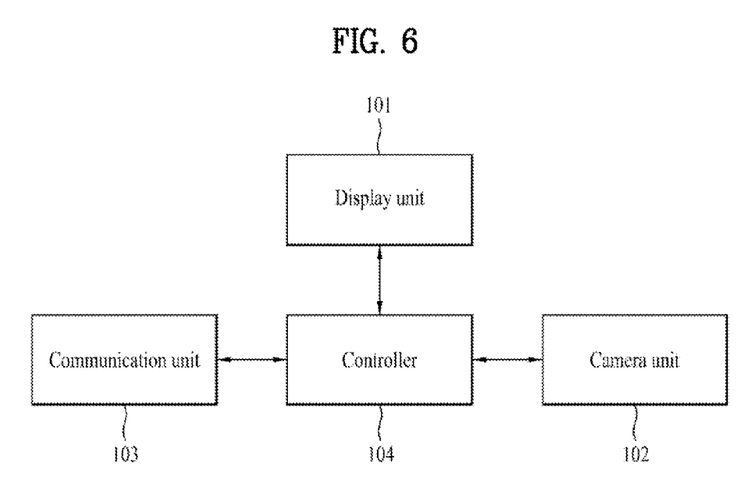
FIG. 6 is a block diagram illustrating an HMD according to one embodiment of the present specification.

FIG. 6 is a block diagram illustrating an HMD according to one embodiment of the present specification. The HMD may include a display unit 101, a camera unit 102, a communication unit 103, and a controller 104.

The display unit 101 may display visual information. The display unit 101 may display the 3D object output from the 3D printer as the augmented reality image or display additional information on the 3D object. The display unit 101 may include a first display unit and second display unit, respectively corresponding to a left eye and a right eye of the user. Also, the display unit 101 may further include a projector.

The display unit 101 may include at least one of an organic light-emitting diode (OLED), a liquid crystal display (LCD), an electron ink, a projector, and a flexible display in accordance with the embodiment.

The camera unit 102 may switch an optical signal into an electrical signal. For example, the camera unit 102 may detect a marker corresponding to the augmented reality image. The camera unit 102 may recognize the 3D printer as the first marker and detect the 3D object output from the 3D printer as the second marker. The camera unit 102 may forward information on the detected first and second markers to the controller 104. The camera unit 102 may include a charge coupled device (CCD) or an image sensor based on complementary metal-oxide semiconductor (CMOS).

The communication unit 103 may transmit digital information to the external device connected with the HMD and receive digital information from the external device. The communication unit 103 may connect the external device with the HMD through direct connection, the cloud service system or the network. The external device may include a 3D printer, which outputs the 3D object, a storage, which stores a figure of the 3D object, and a computer which controls the 3D printer.

The received digital information may include information on the augmented reality image displayed on the HMD. For example, the information on the augmented reality image may be the information on the 3D object output from the 3D printer and the information on the control interface that controls the 3D printer. The communication unit 103 may forward the information on the received augmented reality image to the controller and display the shape of the 3D object as the augmented reality image.

The transmitted digital information may include the information on the 3D object and a control command that controls the 3D printer. The communication unit 103 may transmit the shape information of the 3D object to the 3D printer or the computer that controls the 3D printer. The 3D printer or the computer, which has received the shape information of the 3D object may output the 3D object on the basis of the shape information of the 3D object.

Also, the communication unit 103 may transmit the control command to the 3D printer or the computer that controls the 3D printer, to control the 3D printer. In other words, the communication unit 103 may transmit the control command for temporarily stopping, resuming and canceling 3D printing to control 3D printing.

The controller 104 may control the display unit 101 by using the information forwarded from the camera unit 102 and the communication unit 103. The controller 104 may display the shape of the 3D object as the augmented reality image by using the information on the marker from the camera unit 102 and the information on the 3D object from the communication unit 103.

Before the 3D printer starts 3D printing, the controller 104 may detect at least a part of the 3D printer as the first marker. The controller 104 may display the shape of the 3D object, which will be output from the 3D printer, as the first augmented reality image on the basis of the location of the detected first marker.

Also, the controller 104 may change size, color, material and resolution of the 3D object, which will be output, by controlling at least one of size, color, material and resolution of the displayed augmented reality image.

If the 3D printer starts 3D printing, the controller 104 may detect at least a part of the output 3D object as the second marker. The controller 104 may display the shape of the 3D object, which is being output, as the augmented reality image on the basis of the locations of the detected first and second markers. As 3D printing is performed, if the shape of the 3D object is changed, the controller 104 may update the second marker to correspond to the changed 3D object. In other words, after detecting the 3D object, of which first part is output, as the second marker, if the second part is output additionally to the first part of the 3D object, the controller 104 may detect the first and second parts of the 3D object as the second marker. In other words, the controller 104 may update the second marker to include the first part and the second part.

As 3D printing is performed, the controller 104 may update the displayed augmented reality image. If the 3D object, of which first part is output, is detected as the second marker, the controller 104 may display the other part of the 3D object except for the first part as the second augmented reality image. Also, if the 3D object, of which second part is output additionally to the first part, as the updated second marker, the controller 104 may display the other part of the 3D object except for the first and second parts as the third augmented reality image. In this case, the third augmented reality image may be the result obtained by update of the second augmented reality image.

FIG. 6 is a block diagram according to one embodiment. In FIG. 6, respective blocks are shown to logically identify the elements of the HMD. Accordingly, the aforementioned elements of the HMD may be provided as one chip or a plurality of chips in accordance with design of the HMD.

Figure 7:
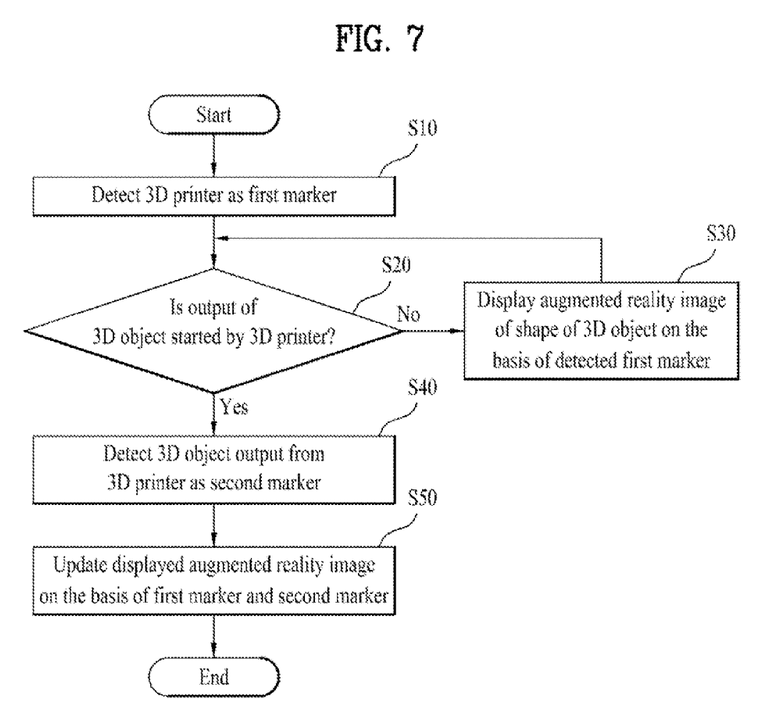
FIG. 7 is a diagram illustrating a method for allowing an HMD according to one embodiment of the present specification to detect a first marker and a second marker.

FIG. 7 is a diagram illustrating a method for allowing an HMD according to one embodiment of the present specification to detect a first marker and a second marker. The HMD may detect the 3D printer, which will output the 3D object, as the first marker (S10). The HMD may be connected with the external device through the network, the cloud service system or direction connection as described with reference to FIG. 1. The HMD may receive the information on the 3D printer and the information on the 3D object, which is output from the 3D printer, from the external device. As described with reference to FIG. 2, the HMD may detect the 3D printer as the first marker by using the received information on the 3D printer. Before detecting whether the 3D object is output at step S20 in accordance with the embodiment, the HMD may display the shape of the 3D object corresponding to the detected first marker as the first augmented reality image.

The HMD may detect whether the 3D object is output by the 3D printer (S20). The HMD may determine whether 3D printing has been started by the 3D printer detected as the first marker, through the camera unit or the communication unit. In this case, the HMD may determine whether 3D printing has been started, based on whether at least a part of the 3D object has been output. If the output scheme of the 3D printer is the FDM scheme or the LOM scheme, the HMD may determine whether 3D printing has been started, based on whether a deposition material of the 3D object has been output from the 3D printer. Also, if the output scheme of the 3D printer is the SLS scheme, DMLS scheme, SLA scheme, EBM scheme or PP scheme, the HMD may determine whether 3D printing has been started, based on either motion of a head of the 3D printer or whether laser or electron beam is emitted from the head of the 3D printer.

If the output of the 3D object is not started by the 3D printer, the HMD may display the shape of the 3D object as the first augmented reality image on the basis of the detected first marker (S30). The HMD may display the shape of the 3D object, which will be output from the 3D printer, as the first augmented reality image on the basis of the detected first marker. In this case, the first augmented reality image may be the 3D augmented reality image. The HMD may extract shape information of the 3D object from the information on the 3D object received from the external device. The HMD may display the shape of the 3D object on the output tray of the 3D printer as the first augmented reality image. In this case, the first augmented reality image displayed by the HMD may be the shape of the part of the 3D object, which is not output. In other words, the HMD may display the final shape of the 3D object, which will be output, as the first augmented reality image. Also, the output tray of the 3D printer may mean the location where the 3D object is output within the 3D printer. As a result, the user may visually identify the first augmented reality image which is displayed.

If the output of the 3D object is started by the 3D printer, the HMD may detect the output 3D object as the second marker (S40). As described with reference to FIG. 2, the HMD may detect the 3D object as the second marker additionally to the detected first marker. The HMD may detect the 3D object, which is being output, by using the shape information of the 3D object among the information of the 3D object, which is received from the external device. The HMD may perform modeling for the 3D object by using the shape information of the 3D object. If the 3D object of which a part is output is matched with at least a part of the modeled 3D object, the HMD may detect the part of the 3D object, which is output, as the second marker. In other words, if the first part of the 3D object is output, the HMD may detect that the first part is matched with the part of the modeled 3D object, and may detect the first part as the second marker. This method may be used effectively when the output scheme of the 3D printer is the FDM scheme or the LOM scheme. In other words, the HMD may detect the second marker when the 3D printing layer is added by the 3D printer.

If the output scheme of the 3D printer is the SLS scheme, DMLS scheme, SLA scheme, EBM scheme or PP scheme, the HMD may not detect the shape of the 3D object, which is being output. In this case, the HMD may detect the location where the head of the 3D printer moves or a track of laser or electron beam emitted from the head of the 3D printer, as the second marker.

The HMD may display the second augmented reality image on the basis of the first marker and the second marker (S50). As described with reference to FIG. 2, the HMD may update the first augmented reality image to the second augmented reality image on the basis of the detected first and second markers. In other words, the HMD may update the first augmented reality image, which includes the entire shape of the 3D object, to the second augmented reality image, which includes a partial shape of the 3D object. In this case, the second augmented reality image may be the 3D augmented reality image.

The second augmented reality image displayed by the HMD may be the shape of the part of the 3D object, which is not output. Namely, the HMD may display the other part except for the first part of the 3D object, which has been already output, as the second augmented reality image. In other words, the HMD may display the other part except for the part corresponding to the second marker, among the entire shape of the 3D object, as the second augmented reality image. As a result, the user may visually identify the second augmented reality image which is displayed. If the output of the 3D object is started, the HMD may inform the user of the process of 3D printing by updating the first augmented reality image to the second augmented reality image in accordance with the progress status of the output 3D object. As 3D printing is performed, the user may identify, through the updated augmented reality image, how much 3D printing has been performed and how much process to be performed remains.

Also, the HMD may display additional information on the 3D object together with the second augmented reality image. The HMD may display at least one of size information, material information, color information, volume information and mass information of the 3D object as the additional information. Also, the HMD may display a progress level of the output process of the 3D object as the additional information by using a graph or numerical value. Also, the HMD may display the control interface that controls the computer or the 3D printer connected therewith. The control interface may include an interface that temporarily stops, resumes or cancels 3D printing.

Figure 8:
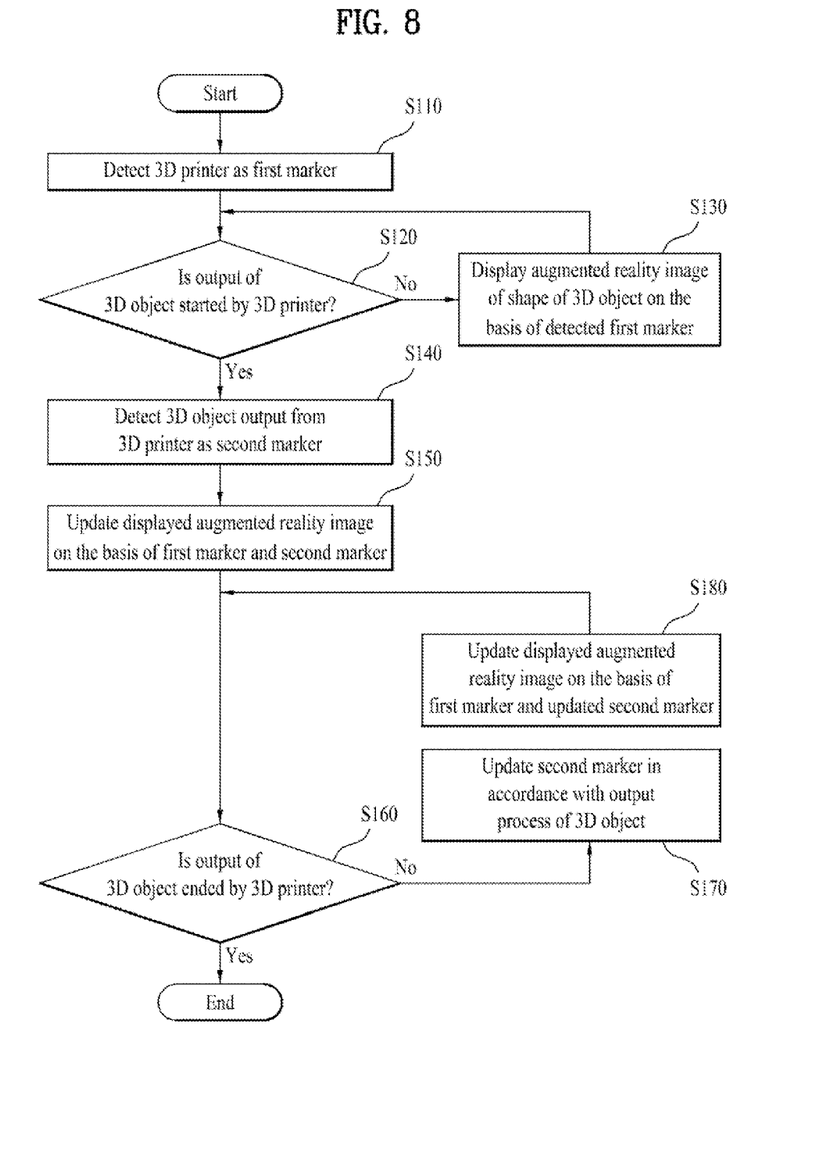
FIG. 8 is a diagram illustrating a method for allowing an HMD according to one embodiment of the present specification to update a second marker which is detected.

FIG. 8 is a diagram illustrating a method for allowing an HMD according to one embodiment of the present specification to update a second marker which is detected. The HMD may detect the 3D printer, which will output the 3D object, as the first marker (S110). The HMD may be connected with the external device through the network, the cloud service system or direction connection as described with reference to FIG. 1. The HMD may receive the information on the 3D printer and the information on the 3D object, which is output from the 3D printer, from the external device. As described with reference to FIG. 2, the HMD may detect the 3D printer as the first marker by using the received information on the 3D printer. Before detecting whether the 3D object is output at step S120 in accordance with the embodiment, the HMD may display the shape of the 3D object corresponding to the detected first marker as the first augmented reality image.

The HMD may detect whether the 3D object is output by the 3D printer (S120). The HMD may determine whether 3D printing has been started by the 3D printer detected as the first marker, through the camera unit or the communication unit. In this case, the HMD may determine whether 3D printing has been started, based on whether at least a part of the 3D object has been output. If the output scheme of the 3D printer is the FDM scheme or the LOM scheme, the HMD may determine whether 3D printing has been started, based on whether a deposition material of the 3D object has been output from the 3D printer. Also, if the output scheme of the 3D printer is the SLS scheme, DMLS scheme, SLA scheme, EBM scheme or PP scheme, the HMD may determine whether 3D printing has been started, based on either motion of a head of the 3D printer or whether laser or electron beam is emitted from the head of the 3D printer.

If the output of the 3D object is not started by the 3D printer, the HMD may display the shape of the 3D object as the first augmented reality image on the basis of the detected first marker (S130). The HMD may display the shape of the 3D object, which will be output from the 3D printer, as the first augmented reality image on the basis of the detected first marker. In this case, the first augmented reality image may be the 3D augmented reality image. The HMD may extract shape information of the 3D object from the information on the 3D object received from the external device. The HMD may display the shape of the 3D object on the output tray of the 3D printer as the first augmented reality image. In this case, the first augmented reality image displayed by the HMD may be the shape of the part of the 3D object, which is not output. In other words, the HMD may display the final shape of the 3D object, which will be output, as the first augmented reality image. Also, the output tray of the 3D printer may mean the location where the 3D object is output within the 3D printer. As a result, the user may visually identify the first augmented reality image which is displayed.

If the output of the 3D object is started by the 3D printer, the HMD may detect the output 3D object as the second marker (S140). As described with reference to FIG. 2, the HMD may detect the 3D object as the second marker additionally to the detected first marker. The HMD may detect the 3D object, which is being output, by using the shape information of the 3D object among the info nation of the 3D object, which is received from the external device. The HMD may perform modeling for the 3D object by using the shape information of the 3D object. If the 3D object of which a part is output is matched with at least a part of the modeled 3D object, the HMD may detect the part of the 3D object, which is output, as the second marker. In other words, if the first part of the 3D object is output, the HMD may detect that the first part is matched with the part of the modeled 3D object, and may detect the first part as the second marker. This method may be used effectively when the output scheme of the 3D printer is the FDM scheme or the LOM scheme. In other words, the HMD may detect the second marker when the 3D printing layer is added by the 3D printer.

If the output scheme of the 3D printer is the SLS scheme, DMLS scheme, SLA scheme, EBM scheme or PP scheme, the HMD may not detect the shape of the 3D object, which is being output. In this case, the HMD may detect the location where the head of the 3D printer moves or a track of laser or electron beam emitted from the head of the 3D printer, as the second marker.

The HMD may display the second augmented reality image on the basis of the first marker and the second marker (S150). As described with reference to FIG. 2, the HMD may update the first augmented reality image to the second augmented reality image on the basis of the detected first and second markers. In other words, the HMD may update the first augmented reality image, which includes the entire shape of the 3D object, to the second augmented reality image, which includes a partial shape of the 3D object. In this case, the second augmented reality image may be the 3D augmented reality image.

The second augmented reality image displayed by the HMD may be the shape of the part of the 3D object, which is not output. Namely, the HMD may display the other part except for the first part of the 3D object, which has been already output, as the second augmented reality image. In other words, the HMD may display the other part except for the part corresponding to the second marker, among the entire shape of the 3D object, as the second augmented reality image.

As a result, the user may visually identify the second augmented reality image which is displayed. If the output of the 3D object is started, the HMD may inform the user of the process of 3D printing by updating the first augmented reality image to the second augmented reality image in accordance with the progress status of the output 3D object. As 3D printing is performed, the user may identify, through the updated augmented reality image, how much 3D printing has been performed and how much process to be performed remains.

Also, the HMD may display additional information on the 3D object together with the second augmented reality image. The HMD may display at least one of size information, material information, color information, volume information and mass information of the 3D object as the additional information. Also, the HMD may display a progress level of the output process of the 3D object as the additional information by using a graph or numerical value. Also, the HMD may display the control interface that controls the computer or the 3D printer connected therewith. The control interface may include an interface that temporarily stops, resumes or cancels 3D printing.

The HMD may detect whether the output of the 3D object by the 3D printer has been ended (S160). The HMD may determine whether 3D printing has been ended by the 3D printer detected as the first marker, through the camera unit or the communication unit. In this case, the HMD may determine whether 3D printing has been ended, based on whether the final shape of the 3D object has been output. If the output scheme of the 3D printer is the FDM scheme or the LOM scheme, the HMD may determine whether 3D printing has been ended, based on whether a deposition material of the 3D object has been output to correspond to the final shape of the 3D object. Also, if the output scheme of the 3D printer is the SLS scheme, DMLS scheme, SLA scheme, EBM scheme or PP scheme, the HMD may determine whether 3D printing has been ended, based on whether motion of the head of the 3D printer has been stopped or whether laser or electron beam is not emitted from the head of the 3D printer.

If the output of the 3D object is not ended by the 3D printer, the HMD may update the second marker in accordance with the output process of the 3D object (S170). If After the first part of the 3D object is output, as 3D printing is performed, if the second part of the 3D object is output, the HMD may update the second marker. If the printing scheme of the 3D printer is the FDM scheme, the HMD may update the second marker when the 3D printing layer is added. The second part of the 3D object may mean the first part or the part of the 3D object, which is output additionally after the first part is output, in accordance with the embodiment. Alternatively, the second part of the 3D object may mean the part additionally output to the first part. Hereinafter, it is assumed that the second part means the part output additionally after the first part is output. The HMD may detect the first and second parts of the 3D object as the second marker.

The HMD may update the second augmented reality image, which is displayed, on the basis of the first marker and the detected second marker (S180). The HMD may detect the first and second parts of the 3D object as the updated second marker. If the updated second marker is detected, the HMD may update the second augmented reality image displayed on the display screen. The HMD may display the third augmented reality image to correspond to the updated second marker. The third augmented reality image may be the image obtained by update of the second augmented reality image.

The HMD may display the part of the 3D object, which is not printed, as the third augmented reality image. Namely, the HMD may display the other shape except for the first and second parts of the 3D object, which have been already output, as the third augmented reality image. In other words, the HMD may display the other part except for the part corresponding to the updated second marker, among the entire shape of the 3D object, as the third augmented reality image.

The HMD may display the third augmented reality image to correspond to the first and second parts of the output 3D object, that is, the updated second marker. The HMD may display the third augmented reality image by seamlessly connecting the third augmented reality image to the first and second parts of the 3D object. Accordingly, the user may identify the first and second parts of the 3D object, which have been already output, as the real object and identify the other part of the 3D object, which is not output, as the virtual object through the third augmented reality image.

As described above, the HMD of the present specification may display the shape of the 3D object, which will be output from the 3D printer, as the augmented reality image before 3D printing is started, thereby informing the user what 3D object will be output. Also, if 3D printing is started, the HMD may indicate the process of 3D printing to the user by updating the displayed augmented reality image to correspond to at least a part of the output 3D object. Also, if 3D printing is started, the HMD may display the information as to when 3D printing is completed and the progress status of 3D printing, thereby providing the user with the additional information on 3D printing.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

What is claimed is:

1. A head mounted display (HMD) comprising:
 a camera unit configured to detect a first marker and a second marker;
 a display unit configured to display an augmented reality image corresponding to at least one of the first marker and the second marker; and
 a controller configured to control the camera unit and the display unit,
 wherein the controller is further configured to:
 detect at least a part of a 3-dimensional (3D) printer as the first marker through the camera unit,
 display a first augmented reality image of a shape of a 3-dimensional (3D) object based on the detected first marker before the 3D object is output by the 3D printer,
 detect at least a part of the 3D object, which is output from the 3D printer, as the second marker when the 3D printer starts to output the 3D object,
 update the first augmented reality image to a second augmented reality image based on both the first marker and the second marker, and
 display the second augmented reality image, and
 wherein the controller is further configured to display a move of the entire first augmented reality image from one location outside the 3D printer to another location inside the 3D printer when a movement of the at least the part of the 3-dimensional (3D) printer from the one location outside the 3D printer to the another location inside the 3D printer is detected prior to the output of the 3D object.

2. The HMD according to claim 1, wherein the first augmented reality image and the second augmented reality image are 3D augmented reality images.

3. The HMD according to claim 2, wherein the first augmented reality image is a 3D image that includes a final shape of the 3D object before the 3D object is output by the 3D printer.

4. The HMD according to claim 2, wherein the first augmented reality image and the second augmented reality image are shapes of the 3D object, which are not output.

5. The HMD according to claim 1, wherein the second augmented reality image represents a non-output part of the 3D object being printed.

6. The HMD according to claim 1, wherein the second augmented reality image is displayed to correspond to a location of the second marker and displayed seamlessly to the second marker.

7. The HMD according to claim 1, wherein the controller further displays additional information on the 3D object together with the first augmented reality image or the second augmented reality image.

8. The HMD according to claim 7, wherein the additional information displayed together with the first augmented reality image includes at least one of size information, material information, color information, volume information and mass information of the 3D object.

9. The HMD according to claim 7, wherein the additional information displayed together with the second augmented reality image includes output process information on the 3D object.

10. The HMD according to claim 1, wherein the controller further displays a control interface for the 3D printer together with the first augmented reality image or the second augmented reality image.

11. The HMD according to claim 1, wherein the second marker is a part of the 3D object.

12. The HMD according to claim 11, wherein, when a first part of the 3D object is output from the 3D printer, the controller detects the first part as the second marker.

13. The HMD according to claim 12, wherein, when a second part is output additionally to the first part of the 3D object, the controller detects the first part and the second part as the second marker.

14. The HMD according to claim 1, wherein the 3D object is formed by at least one 3D printing layer output from the 3D printer.

15. The HMD according to claim 14, wherein the controller updates the displayed second augmented reality image when the 3D printing layer is added.

16. The HMD according to claim 1, further comprising a communication unit configured to transmit and receive data to and from an external device.

17. The HMD according to claim 16, wherein the HMD performs paring with the 3D printer through the communication unit and receives information on the 3D object or information on the first augmented reality image from the 3D printer.

18. The HMD according to claim 17, wherein the information on the 3D object includes at least one of shape information, material information, color information, mass information and volume information of the 3D object.

19. The HMD according to claim 17, wherein the information on the 3D object includes information as to the remaining time until the output of the 3D object is completed.

20. The HMD according to claim 16, wherein the external device includes the 3D printer, a cloud service system, a smart phone, a tablet computer, a notebook computer, or a desktop computer.

21. The HMD according to claim 1, wherein the first augmented reality image is a final shape of the 3D object.

22. The HMD according to claim 1, wherein the HMD displays the first augmented reality image at a first location where the 3D object is output within the 3D printer, and when the first location is changed, moves the displayed first augmented reality image to the changed first image.

23. A method for controlling a head mounted display (HMD), the method comprising:

detecting at least a part of a 3-dimensional (3D) printer as a first marker through a camera unit;

displaying a first augmented reality image of a shape of a 3-dimensional (3D) object based on the detected first marker before the 3D object is output by the 3D printer;

detecting at least a part of the 3D object, which is output from the 3D printer, as a second marker when the 3D printer starts to output the 3D object;

updating the first augmented reality image to a second augmented reality image based on both the first marker and the second marker;

displaying the second augmented reality image; and displaying a move of the entire first augmented reality image from one location outside the 3D printer to another location inside the 3D printer when a movement of the at least the part of the 3-dimensional (3D) printer from the one location outside the 3D printer to the another location inside the 3D printer is detected prior to the output of the 3D object.

* * * * *